(12) United States Patent
Rains et al.

(10) Patent No.: US 9,635,802 B2
(45) Date of Patent: May 2, 2017

(54) AUTOMATIC SEEDING SYSTEM MOTOR REVERSAL

(71) Applicant: Deere & Company, Moline, IL (US)

(72) Inventors: Gerald E. Rains, Eldridge, IA (US); Michael E. Frasier, Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/874,208

(22) Filed: Oct. 2, 2015

(65) Prior Publication Data

US 2017/0094893 A1    Apr. 6, 2017

(51) Int. Cl.
| | |
|---|---|
| A01C 21/00 | (2006.01) |
| A01C 7/04 | (2006.01) |
| A01C 7/12 | (2006.01) |
| A01C 14/00 | (2006.01) |
| A01C 7/16 | (2006.01) |
| A01C 5/06 | (2006.01) |

(52) U.S. Cl.
CPC .............. *A01C 7/046* (2013.01); *A01C 7/128* (2013.01); *A01C 7/16* (2013.01); *A01C 14/00* (2013.01); *A01C 21/00* (2013.01); *A01C 5/064* (2013.01); *A01C 5/068* (2013.01)

(58) Field of Classification Search
CPC ........... A01C 7/046; A01C 7/128; A01C 7/16; A01C 14/00; A01C 21/00
USPC ............... 701/50; 340/684, 606; 702/45, 41; 221/258; 222/63; 72/111
See application file for complete search history.

(56) References Cited

U.S. PATENT DOCUMENTS

| | | | |
|---|---|---|---|
| 6,081,224 A * | 6/2000 | Rosenbrock | A01C 7/102 342/103 |
| 8,746,159 B2 | 6/2014 | Garner et al. | |
| 9,398,739 B2 * | 7/2016 | Silbernagel | A01C 7/046 |
| 2012/0266795 A1 * | 10/2012 | Silbernagel | A01C 7/046 111/149 |
| 2016/0128273 A1 * | 5/2016 | Garner | A01C 7/20 111/185 |

FOREIGN PATENT DOCUMENTS

| | | | |
|---|---|---|---|
| CN | 102645907 | * | 8/2012 |
| JP | 2011050296 | * | 3/2011 |

* cited by examiner

*Primary Examiner* — Marthe Marc-Coleman
(74) *Attorney, Agent, or Firm* — Joseph R. Kelly; Kelly, Holt & Christenson, PLLC

(57) ABSTRACT

A motor drives a seeding system. A sensor senses a characteristic of the motor and a motor jam is detected based on the sensed characteristic. The motor is momentarily reversed, when a jam is detected.

20 Claims, 8 Drawing Sheets

AUTOMATIC SEEDING SYSTEM MOTOR REVERSAL

FIELD OF THE DESCRIPTION

The present description relates to planting equipment. More specifically, the present description relates to automatically reversing a motor to remove a jam in a planting machine.

BACKGROUND

There are a wide variety of different types of agricultural seeding or planting machines. They can include row crop planters, grain drills, air seeders or the like. These machines place seeds at a desired depth within a plurality of parallel seed trenches that are formed in the soil. Thus, these machines can carry one or more seed hoppers. The mechanisms that are used for moving the seed from the seed hopper to the ground often include a seed metering system and a seed delivery system.

The seed metering system receives the seeds in a bulk manner, and divides the seeds into smaller quantities (such as a single seed, or a small number of seeds—depending on the seed size and seed type) and delivers the metered seeds to the seed delivery system. The seed metering system uses a rotating mechanism (which is normally a disc or a concave or bowl-shaped mechanism) that has seed receiving cells, that receive the seeds from a seed pool and move the seeds from the seed pool to the seed delivery system which delivers the seeds to the ground (or to a location below the surface of the ground, such as in a trench). The seeds can be biased into the seed cells in the seed metering system using air pressure (such as a vacuum or a positive air pressure differential).

There are also different types of seed delivery systems that move the seed from the seed metering system to the ground. One seed delivery system is a gravity drop system that includes a seed tube that has an inlet position below the seed metering system. Metered seeds from the seed metering system are dropped into the seed tube and fall (via gravitational force) through the seed tube into the seed trench. Other types of seed delivery systems are assistive systems, in that they do not simply rely on gravity to move the seed from the metering mechanism into the ground. Instead, such systems actively capture the seeds from the seed meter and physically move the seeds from the meter to a lower opening, where they exit into the ground or trench.

In these types of planting machines, the metering system and the delivery system are both often driven by separate motors. The motors can be electric or other motors.

The discussion above is merely provided for general background information and is not intended to be used as an aid in determining the scope of the claimed subject matter.

SUMMARY

A motor drives a seeding system. A sensor senses a characteristic of the motor and a motor jam is detected based on the sensed characteristic. The motor is momentarily reversed, when a jam is detected.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Seed metering systems and seed delivery systems are often exposed to rugged terrain and movement, thereby jolting the contents inside the systems. A jam can occur in such systems, such as when seed becomes lodged in an unsuitable position within the metering system or within the delivery system. For example, in the metering system, the seed receiving cells can catch an individual seed at an awkward angle, or catch multiple seeds in a space that is optimized for only one seed. This can cause the meter to jam. The same can happen in the seed delivery system.

When a jam occurs, the metering system or delivery system may be unable to rotate in the normal, forward, direction. In some cases, an operator may have no way of knowing when a jam occurs. This can lead to improperly distributed seed which can detrimentally affect yield.

Figure 1:
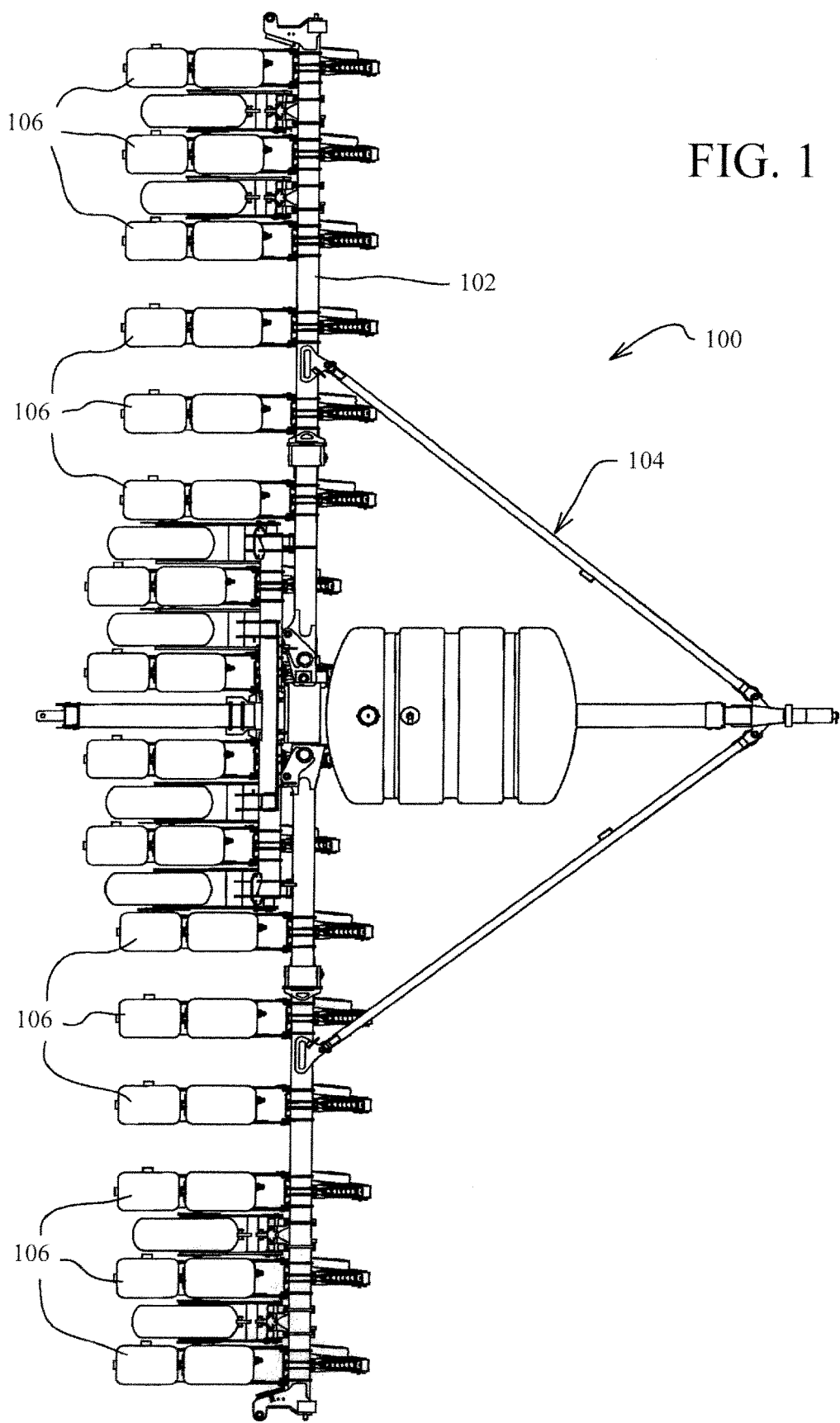
FIG. 1 shows one example of a top view of a planting machine.

FIG. 1 is a top view of one example of an agricultural seeding machine 100. Seeding machine 100 illustratively includes a toolbar 102 that is part of a frame 104. FIG. 1 also shows that a plurality of planting row units 106 are mounted to the toolbar. Machine 100 can be towed behind another machine, such as a tractor.

Figure 2:
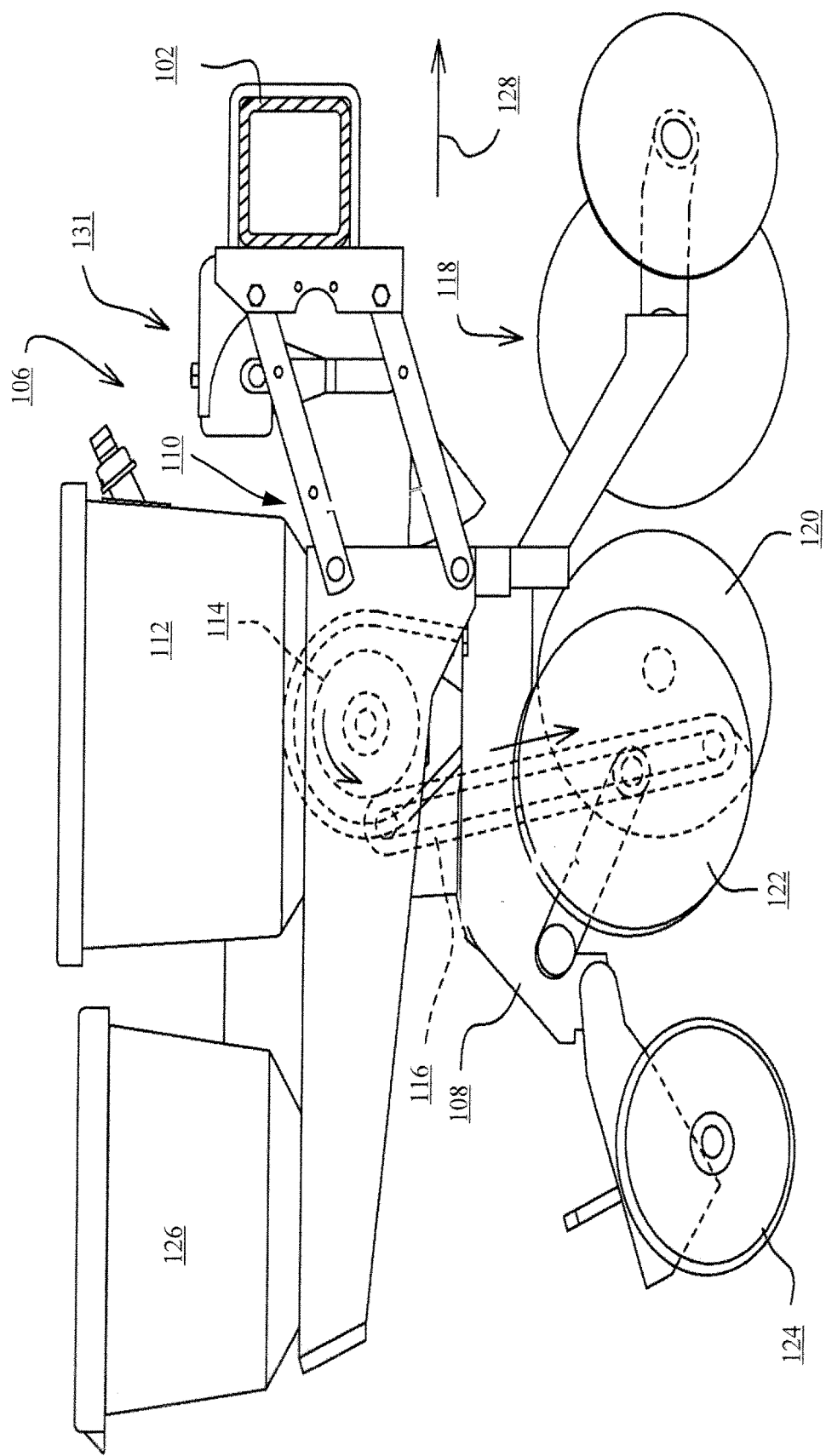
FIG. 2 shows one example of a side view of a row unit of the planting machine shown in FIG. 1.

FIG. 2 is a side view showing one example of a row unit 106 in more detail. FIG. 2 shows that each row unit 106 illustratively has a frame 108. Frame 108 is illustratively connected to toolbar 102 by a linkage shown generally at 110. Linkage 110 is illustratively mounted to toolbar 102 so that it can move upwardly and downwardly (relative to toolbar 102).

Row unit 106 also illustratively has a seed hopper 112 that stores seed. The seed is provided from hopper 112 to a seed metering system 114 that meters the seed and provides the metered seed to a seed delivery system 116 that delivers the seed from the metering system 114 to the furrow or trench generated by the row unit. In one example, metering system 114 uses a rotatable member, such as a disc or concave-shaped rotating member, and an air pressure differential to retain seed on the disc and move it from a seed pool of seeds (provided from hopper 112) to the delivery system 116. Other types of meters can be used as well.

FIG. 2 also shows that, in one example, row unit 106 illustratively includes a row cleaner 118, a furrow opener 120, a set of gauge wheels 122, and a set of closing wheels 124. It can also include an additional hopper 126 that can be used to provide additional material, such as a fertilizer or another chemical.

In operation, as row unit 106 moves in the direction generally indicated by arrow 128, row cleaner 118 generally cleans the row and opener 120 opens a furrow in the row. Gauge wheels 122 illustratively control a depth of the furrow, and seed is metered by metering system 114 and delivered to the furrow by delivery system 116. Closing wheels 124 close the trench over the seed. A downforce generator 131 can also be provided to controllably exert downforce to keep the row unit in desired engagement with the soil.

Figure 3:
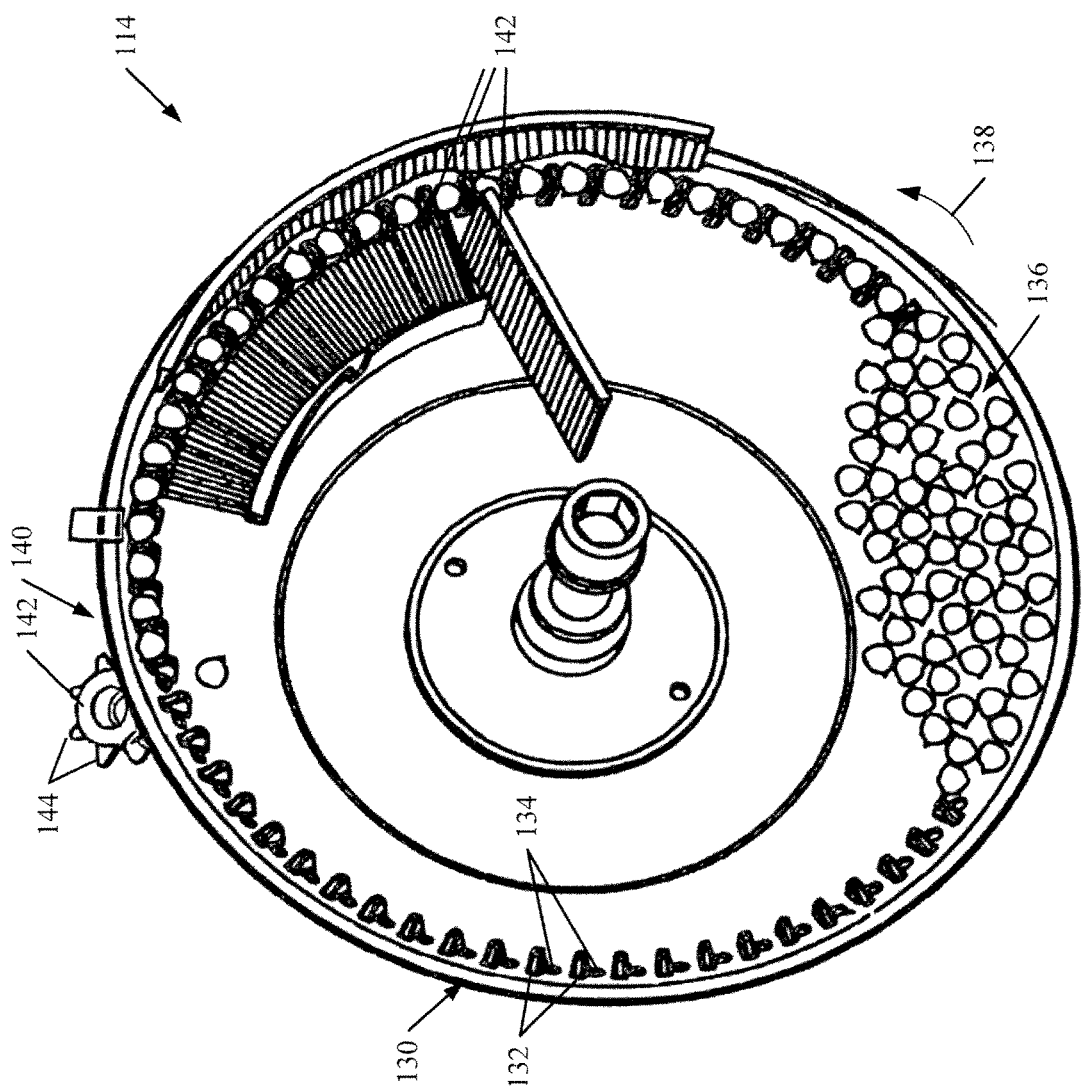
FIG. 3 is a perspective view of a portion of a seed metering system.

FIG. 3 shows one example of a rotatable mechanism that can be used as part of the metering system. The rotatable mechanism includes a rotatable disc, or concave element, 130. Rotatable element 130 has a cover (not shown) and is rotatably mounted relative to the frame 108 of the row unit 106. Rotatable element 130 is driven by a motor (shown in FIG. 4) and has a plurality of projections or tabs 132 that are closely proximate corresponding apertures 134. Tabs 132 and apertures 134 form seed receiving cells that are disposed generally about a periphery of rotating mechanism 130. A seed pool 136 is disposed generally in a lower portion of an enclosure formed by rotating mechanism 130 and its corresponding cover. Mechanism 130 is rotatably driven by its motor (such as an electric motor, a pneumatic motor, etc.) for rotation generally in the direction indicated by arrow 138, about a hub. A pressure differential is introduced into the interior of the metering mechanism so that the pressure differential influences seeds from seed pool 136 to be drawn to apertures 134. For instance, a vacuum can be applied to draw the seeds from seed pool 136 so that they come to rest in apertures 134, where the vacuum holds them in place. Alternatively, a positive pressure can be introduced into the interior of the metering mechanism to create a pressure differential across apertures 134 to perform the same function.

Once a seed comes to rest in (or proximate) an aperture 134, the vacuum or positive pressure differential acts to hold the seed within the aperture 134 such that the seed is carried upwardly generally in the direction indicated by arrow 138, from seed pool 136, to a seed discharge area 140. It may happen that multiple seeds are residing in an individual seed cell. In that case, a set of brushes or other members 142 that are located closely adjacent the rotating seed cells tend to remove the multiple seeds so that only a single seed is carried by each individual cell.

Once the seeds reach the seed discharge area 140, the vacuum or other pressure differential is illustratively removed, and a positive seed removal wheel 142 can act to remove the seed from the seed cell. Wheel 142 illustratively has a set of projections 144 that protrude at least partially into apertures 134 to actively dislodge the seed from those apertures.

When the seed is dislodged, it is illustratively moved by the delivery system 116 (two examples of which are shown below in FIGS. 3A and 3B) to the furrow in the ground.

Figure 3A:
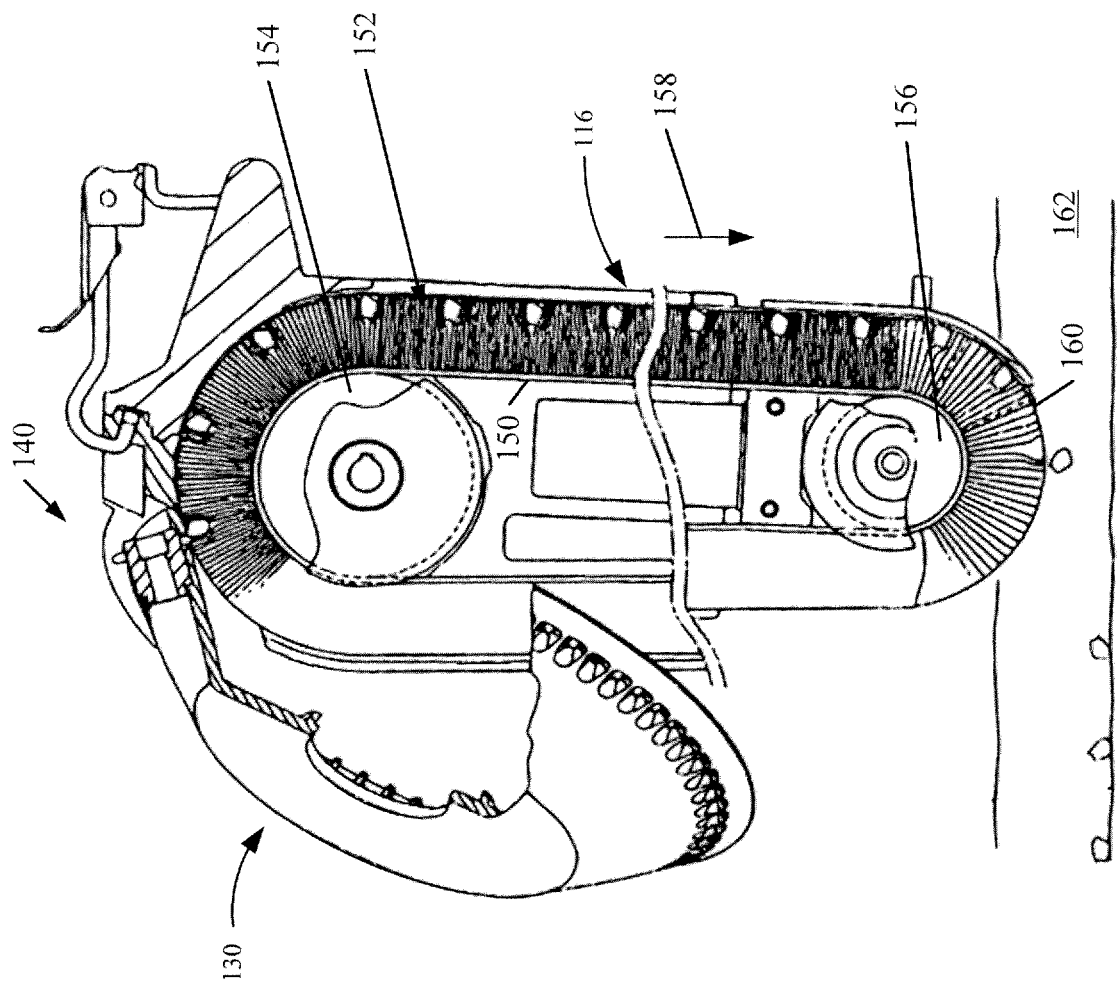
FIGS. 3A and 3B show two examples of different seed delivery systems that can be used with a seed metering system.

FIG. 3A shows an example where the rotating element 130 is positioned so that its seed discharge area 140 is above, and closely proximate, seed delivery system 116. In the example shown in FIG. 3A, seed delivery system 116 includes a belt 150 with a brush that is formed of distally extending bristles 152 attached to belt 150. Belt 150 is mounted about pulleys 154 and 156. One of pulleys 154 and 156 is illustratively a drive pulley while the other is illustratively an idler pulley. The drive pulley is illustratively rotatably driven by a motor (shown in FIG. 4 below) which can be an electric motor, a pneumatic motor, etc. Belt 150 is driven generally in the direction indicated by arrow 158.

Therefore, when seeds are moved by rotating element 130 to the seed discharge area 140, where they are discharged from the seed cells in rotating mechanism 130, they are illustratively positioned within the bristles 152 by the projections 132 following each aperture that pushes the seed into the bristles. Delivery mechanism 116 illustratively includes walls that form an enclosure around the bristles, so that, as the bristles move in the direction indicated by arrow 158, the seeds are carried along with them from the seed discharge area 140 of the metering mechanism, to a discharge area 160 either at ground level, or beneath ground level within a trench or furrow 162 that is generated by the furrow opening wheels 120 on the row unit.

Figure 3B:
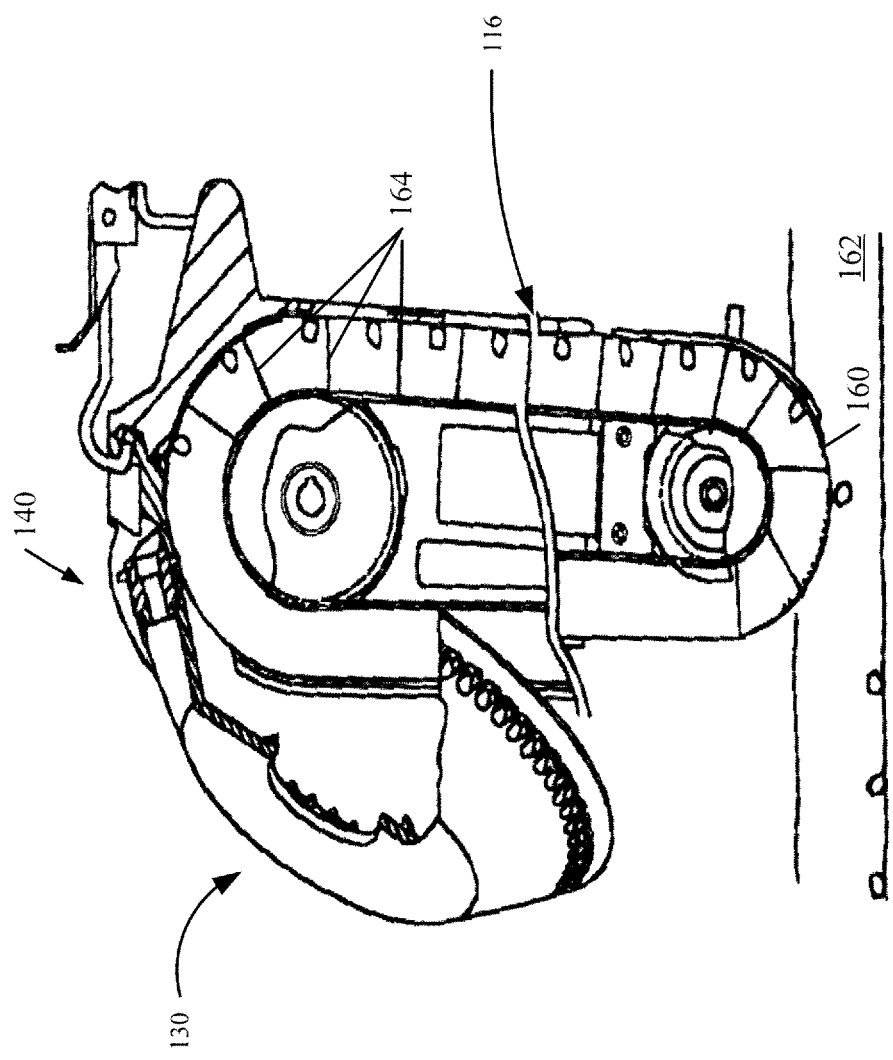

FIG. 3B is similar to FIG. 3A, except that delivery system 116 is not formed by a belt with distally extending bristles. Instead, it is formed by a flighted belt in which a set of paddles 164 form individual chambers, into which the seeds are dropped, from the seed discharge area 140 of the metering mechanism. The flighted belt moves the seeds from the seed discharge area 140 to the discharge area 160 within the trench 162.

For a variety of reasons, either the seed metering system 114 or the seed delivery system 116 may become jammed. For instance, when a seed is improperly positioned within a seed cell (e.g., it may be only partially seated within the seed cell) it can become jammed between the protrusions or tabs 132 and a wall portion or another part of the seed meter. This can stop rotation of rotatable element 130 so that the motor driving its rotation is no longer capable of driving it in the forward direction. This causes the seed metering system 114 to jam. For similar or other reasons, the same thing can happen within seed delivery system 116. That is, improper seed placement, seed bunching, or for other reasons, the system may become jammed, stopping its rotation, so that its motor can no longer continue to drive it in the forward direction.

Figure 4:
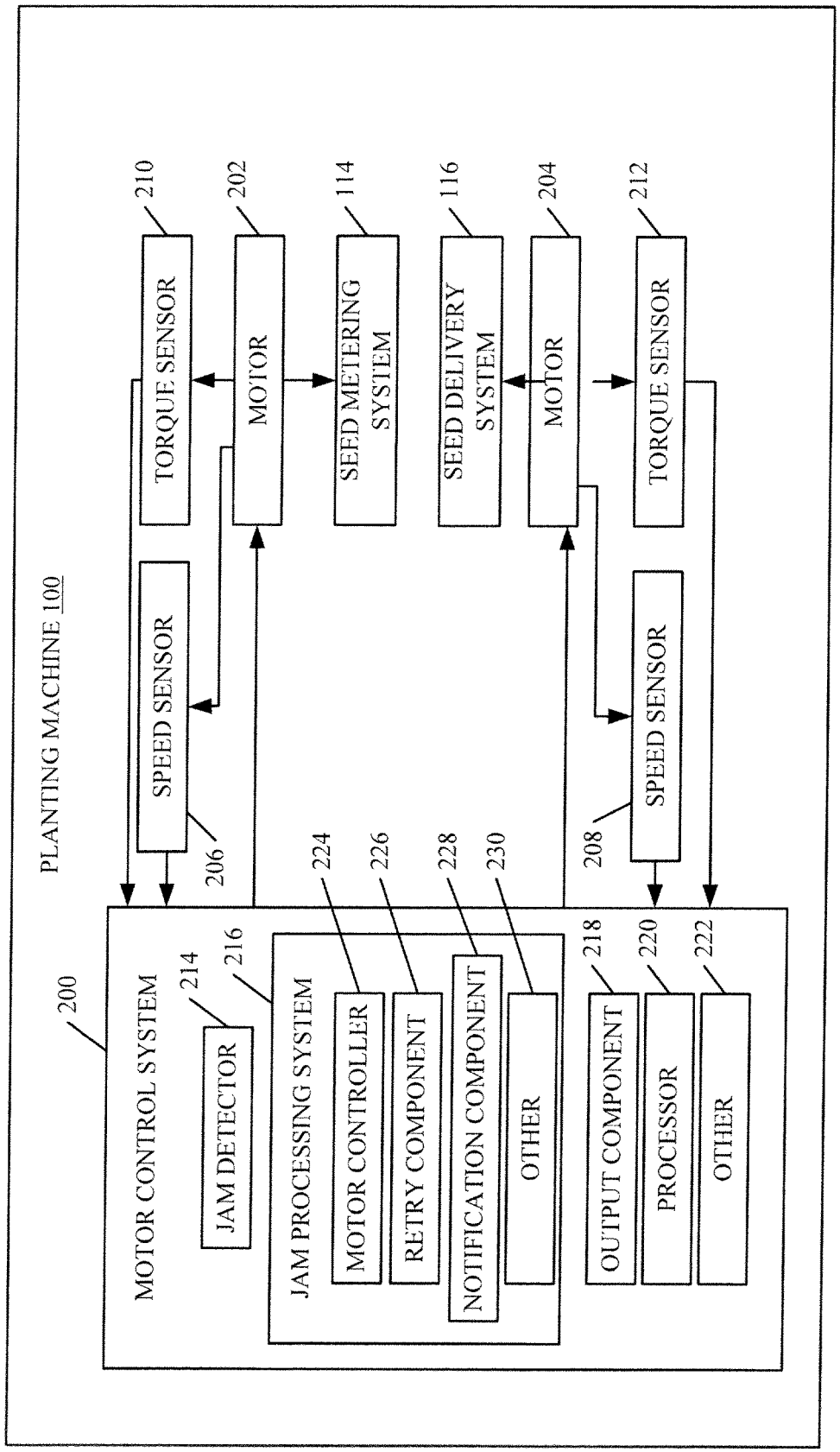
FIG. 4 is a simplified block diagram of one example of a planting machine.

FIG. 4 shows a block diagram of one example of a control system that can be used to momentarily reverse the motor direction to allow the mechanism to become unjammed, automatically. For example, where the metering system 114 is jammed, the motor that drives rotation of the metering system 114 can be momentarily reversed to allow the jammed seed to be dislodged, thereby unjamming the motor so that planting can continue. Similarly, when the seed delivery system 116 becomes jammed, the motor that drives the seed delivery system 116 can be momentarily reversed to allow the jam to resolve itself.

FIG. 4 shows, in block diagram form, some portions of planting machine 100. In the example shown in FIG. 4, machine 100 illustratively includes a motor control system 200 that controls a set of motors 202 and 204. In the example shown in FIG. 4, motor 202 drives the seed metering system 114 and motor 204 drives seed delivery system 116. It will be appreciated that both systems could be driven by a single motor as well.

Motor control system 200 illustratively receives a set of sensor signals from speed sensors 206 and 208, and from torque sensors 210 and 212. Speed sensors 206 and 208 illustratively sense the speed of rotation of motors 202 and 204, respectively. Torque sensors 210 and 212 illustratively sense the torque generated by the output shafts of motors 202 and 212, respectively. In one example, motor control system 200 detects whether there is a jam in seed metering system 114 or seed delivery system 116, based upon the sensor signals received, and then momentarily reverses the direction of the motor that drives the jammed system. Thus, motor control system 200 illustratively includes jam detector 214, jam processing system 216, output component 218, processor 220, and it can include other items 222. Jam processing system 216, itself, illustratively includes motor controller 224, retry component 226, notification component 228, and it can include other items 230.

Figure 5:
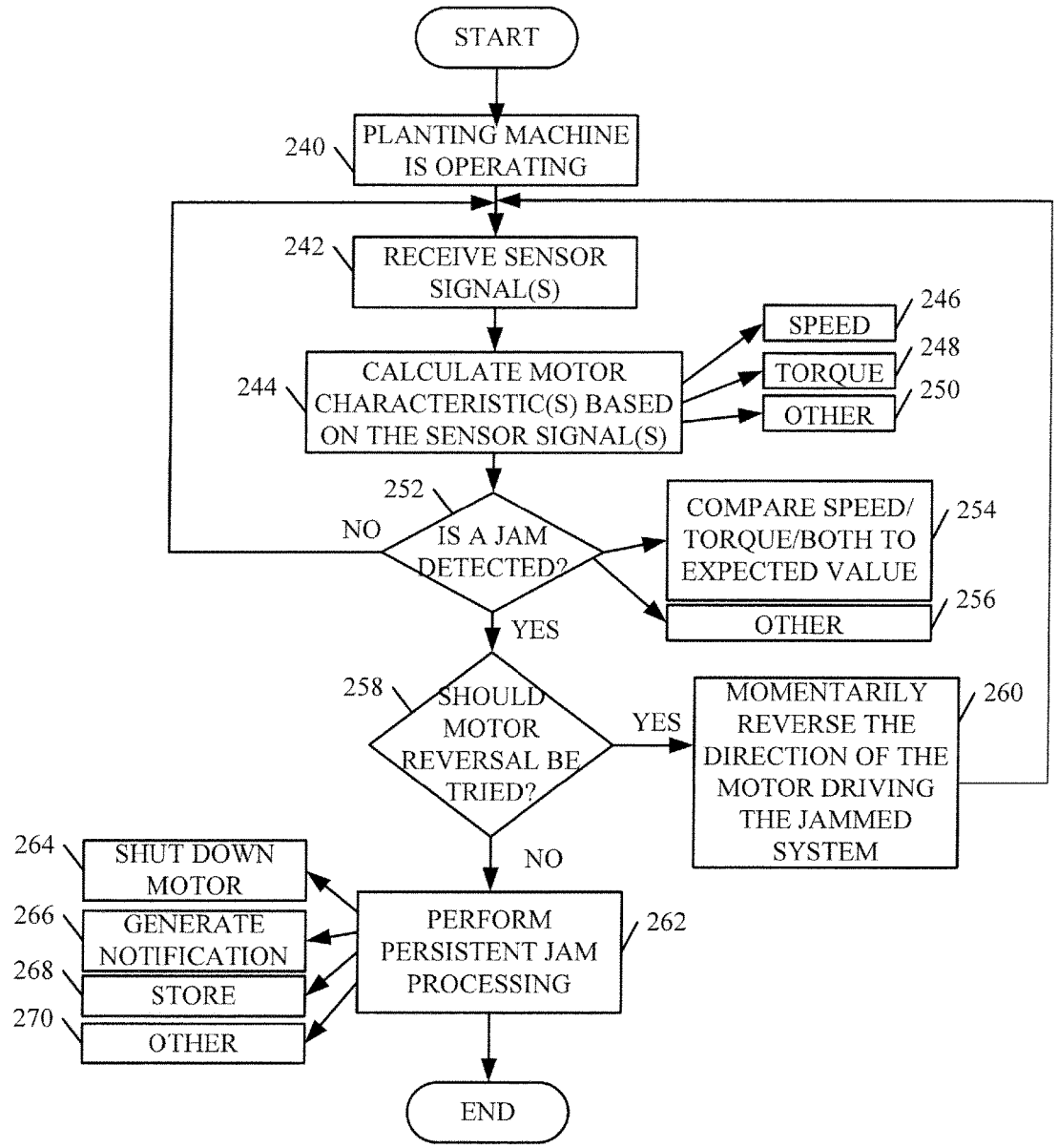
FIG. 5 is a flow diagram of one example of the operation of the planting machine shown in FIG. 4.

FIG. 5 is a flow diagram illustrating one example of the operation of planting machine 100 (shown in FIG. 4) in attempting to resolve a jam in either seed metering system 114 or seed delivery system 116. FIGS. 4 and 5 will now be described in conjunction with one another.

It is first assumed that planting machine 100 is operating. This is indicated by block 240 in FIG. 5. Jam detector 214 receives the sensor signals from speed sensors 206 and 208 and from torque sensors 210 and 212. This is indicated by block 242. It then illustratively calculates a motor characteristic based on the received sensor signals. This is indicated by block 244. In one example, the sensor signals, themselves, provide a direct measure of the sensed variable (e.g., motor speed or motor torque). In another example, however, they are indicative of speed and torque, and jam detector 214 calculates the actual motor speed or motor torque based upon the sensor signal values. Calculating motor speed is indicated by block 246 in FIG. 5. Calculating torque is indicated by block 248. It will be noted that jam detector 214 can calculate other characteristics 250 as well.

Jam detector 214 then determines whether seed metering system 114 or seed delivery system 116 is jammed, based upon the calculated characteristics. This is indicated by block 252. In one example, for instance, jam detector 214 will determine that the detected motor speed or motor torque (or both) have deviated from a normal range of operation. By way of example, during normal seeding operation, the motor speed of motors 202 and 204 may be within a pre-defined (or within a dynamically calculated, but expected) range. Jam detector 214 may then identify that a jam has occurred if the motor speed has fallen significantly below the expected range. For instance, where the seed metering system 114 is jammed, the motor speed will essentially be zero. The same is true of the seed delivery system 116.

Alternatively, or in addition, jam detector 214 may determine that the output torque being applied by the particular motor has increased beyond an expected range. For instance, if the seed metering system 114 or the seed delivery system 116 is jammed, but the corresponding motor continues to attempt to drive the system, then the torque on the output shaft of the motor will increase beyond its expected operating range.

In another example, jam detector 214 can consider both the motor speed and motor torque to determine whether a jam has likely occurred. Comparing the speed, torque, or both, to expected values in order to determine that a jam has occurred is indicated by block 254. Jam detector 214 can detect jams in other ways as well, as indicated by block 256.

If, at block 252, no jam has occurred, then processing simply reverts to block 242. Motor control system 200 continues to receive sensor signals from the various sensors.

However, if, at block 252, it is determined that a jam has been detected, then jam processing system 216 determines whether a momentary motor reversal should be attempted, in order to attempt to resolve the jam. This is indicated by block 258. It may be that it is only desirable to attempt to automatically resolve the jam a pre-determined number of times, before the jammed system is shut down, and the operator is notified. Therefore, in one example, retry component 226 determines whether the motor reversal should be tried by determining whether it has already been tried, for this jam, a pre-determined number of times. Retry component 226 may, for instance, include a retry counter or another mechanism that counts the number of times that motor control system 200 has attempted to automatically resolve this particular jam. If retry component 226 determines that the momentary motor reversal should be tried, then it increments the retry counter and processing continues at block 260.

In that case, motor controller 224 provides motor control signals to the jammed motor 202 or 204 to momentarily reverse its direction. Momentarily reversing the motor direction often allows the seed or seeds that are causing the jam to move so that the corresponding system is no longer jammed. Therefore, motor controller 224 momentarily reverses the direction of the motor driving the jammed system and then again attempts to drive it in the forward direction, and processing reverts to block 242. If the jam has been successfully resolved, then jam detector 214 will no longer detect a jam, in that system, based upon the received sensor signals. The retry counter can be reset. However, if the jam persists, then processing will continue to block 258 where retry component 226 again determines whether the momentary motor reversal should be retried.

It will be noted that when one of the motors 202 or 204 is momentarily reversed, the other motor can be controlled in a variety of different ways. For instance, when one of the motors is momentarily reversed, the other may be momentarily stopped until the reversed motor is again rotating in the forward direction. In another example, when one motor is momentarily reversed, the other is momentarily reversed a well. In yet another example, the two motors are controlled differently. For instance, it may be that when motor 202 is momentarily reversed, motor 204 can be stopped, reversed, or it can keep running in the forward direction. However, when motor 204 is momentarily reversed, it may be that motor 202 is always stopped, or controlled in a different fashion than how motor 204 is controlled when motor 202 is momentarily reversed. All of these examples are contemplated herein.

When a jam is present and the motor reversal is not to be retried, then jam processing system 216 illustratively performs persistent jam processing, because it is determined that the jam cannot be automatically resolved by reversing the motor. This is indicated by block 262. This can include a wide variety of different processing steps. For instance, motor controller 224 can shut down the motor driving the jammed system. This is indicated by block 264. This can be done in an attempt to avoid damaging the motor or other equipment in the jammed system.

In addition, notification component 228 can generate an operator notification. This is indicated by block 266. This can take a wide variety of different forms as well. For instance, where the planting machine is being towed by another machine (such as a tractor), the notification can be generated in the operator compartment of the tractor. The notification can be, for instance, a visual notification displayed on a display screen, an audible notification, a haptic notification, etc. This can allow the operator to take any desired corrective action.

In addition, jam processing system 216 can store information indicating which particular system jammed, the number of times it has jammed, the location where it has jammed, etc. This is indicated by block 268. This type of information of may tend to indicate that the system is failing for other reasons, such as worn parts, improper settings, etc. The persistent jam processing can take other forms as well, and this is indicated by block 270.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
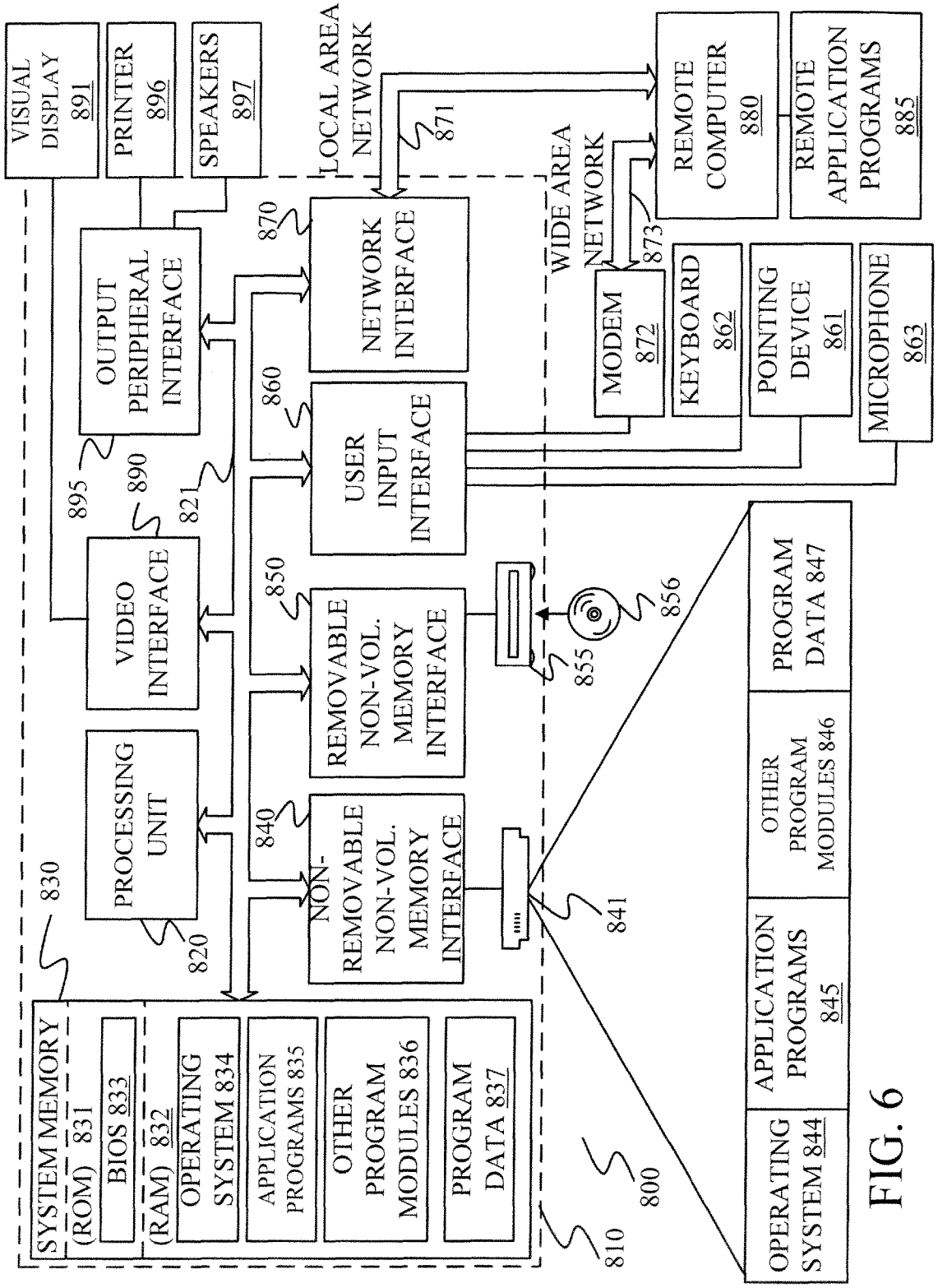
FIG. 6 is a block diagram of one example of a computing environment that can be used on the planting machine shown in FIG. 4.

FIG. 6 is one example of a computing environment in which elements of FIG. 4, or parts of it, (for example) can be deployed. With reference to FIG. 6, an example system for implementing some embodiments includes a general-purpose computing device in the form of a computer 810. Components of computer 810 may include, but are not limited to, a processing unit 820 (which can comprise processor 220), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 4 can be deployed in corresponding portions of FIG. 6.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 6 illustrates operating system 834, application programs 835, other program modules 836, and program data 837.

The computer 810 may also include other removable/non-removable volatile/nonvolatile computer storage media. By way of example only, FIG. 6 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 6, provide storage of computer readable instructions, data structures, program modules and other data for the computer 810. In FIG. 6, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers

897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 6 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Example 1 is a mobile planting machine, comprising:
- a seeding system configured to meter and deliver seed from the mobile planting machine, the seeding system comprising:
  - a motor that drives the seeding system; and
  - a sensor configured to sense a characteristic of the motor and generate a sensor signal indicative of the characteristic;
- a jam detection component configured to receive the sensor signal and detect a jam in the seeding system and generate a jam signal; and
- a motor control system configured to receive the jam signal and reverse an operating direction of the motor based on the jam signal.

Example 2 is the mobile planting machine of any or all previous examples and further comprising:
- a user interface component configured to display information related to the mobile planting machine, wherein the user interface component is configured to receive the jam signal and provide a jam indication based on the jam signal.

Example 3 is the mobile planting machine of any or all previous examples wherein the seeding system comprises a seed metering system in a row unit.

Example 4 is the mobile planting machine of any or all previous examples, wherein the seed metering system comprises:
- a rotatable metering component, configured to meter seed, wherein the motor is a metering motor configured to drive the rotatable metering component, and wherein the jam detection component is configured to generate the jam signal indicative of a jam in the rotatable metering component.

Example 5 is the mobile planting machine of any or all previous examples wherein the seeding system comprises:
- a seed delivery system and wherein the motor drives the seed delivery system.

Example 6 is the mobile planting machine of any or all previous examples wherein the seed delivery system comprises:
- a brush belt comprising a plurality of bristles configured to receive metered seeds, and wherein the motor is a conveyance motor configured to drive the brush belt, wherein the jam detection component is configured to generate the jam signal indicative of a jam in the seed delivery system.

Example 7 is the mobile planting machine of any or all previous examples wherein the seed delivery system comprises a flighted belt delivery component.

Example 8 is the planting machine of any or all previous examples, wherein the sensor comprises:
- a motor speed sensor that detects a motor speed of the motor.

Example 9 is the planting machine of any or all previous examples, wherein the sensor comprises:
- a torque sensor that detects a torque generated by the motor.

Example 10 is a method of controlling a mobile planting machine, the method comprising:
- sensing a characteristic of a motor that drives a seeding system;
- generating a sensor signal indicative of the sensed characteristic of the motor;
- detecting whether a jam occurs in the seeding system based on the sensor signal;
- if so, controlling the motor to move in a reverse direction; and
- controlling the motor to move in a forward direction.

Example 11 is the method of any or all previous examples, wherein sensing a characteristic of the motor comprises:
- sensing a motor speed of the motor.

Example 12 is the method of any or all previous examples, wherein sensing a characteristic of the motor comprises:
- sensing a torque generated by the motor.

Example 13 is the method of any or all previous examples and further comprising:
- repeating the step of detecting whether a jam is present in the seeding system; and
- if so, controlling the motor to momentarily reverse the direction of the motor a predetermined number of times.

Example 14 is the method of any or all previous examples and further comprising:
- if the steps are repeated the predetermined number of times, then generating an operator jam notification.

Example 15 is a method for resolving a detected jam in a mobile planting machine, the method comprising:
- receiving a signal based on a sensed characteristic of a motor driving a seeding system in the planting machine;
- detecting a jam within the seeding system, based on the signal;
- controlling the motor to operate in a reverse direction;
- controlling the motor to operate in a forward direction;
- receiving the signal indicative of the characteristic of the motor; and
- determining, based on the received signal, whether the jam is still detected.

Example 16 is the method of any or all previous examples, wherein the seeding system comprises a metering system with a metering motor, and wherein receiving the signal comprises:
- receiving the signal from a sensor sensing the characteristic of the metering motor.

Example 17 is the method of any or all previous examples, wherein the seeding system comprises a seed delivery system with a conveyance motor, and wherein receiving the signal comprises:
- receiving the signal from a sensor sensing the characteristic of the conveyance motor.

Example 18 is the method of any or all previous examples, wherein the signal comprises a motor speed signal indicative of motor speed, and wherein detecting a jam comprises:
   comparing the motor speed to a threshold motor speed;
   determining whether the motor speed is less than the threshold motor speed; and
   if so, detecting a jam.

Example 19 is the method of any or all previous examples, wherein the signal comprises a torque signal indicative of a torque generated by the motor and wherein detecting a jam comprises:
   comparing the torque to a threshold motor torque;
   determining whether the torque is greater than the threshold motor torque; and
   if so, detecting a jam.

Example 20 is the method of any or all previous examples, and further comprising:
   in response to determining that the jam is still detected, repeating the steps of controlling the motor to operate in the reverse direction;
   controlling the motor to operate in the forward direction;
   receiving the signal; and
   determining, based on the signal, whether the jam is still detected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile planting machine, comprising:
   a seeding system configured to meter and deliver seed from the mobile planting machine, the seeding system comprising:
      a motor that drives the seeding system; and
      a sensor configured to sense a characteristic of the motor and generate a sensor signal indicative of the characteristic;
   a jam detection component configured to receive the sensor signal and compare the sensor signal to a predefined range, wherein predefined range indicates a normal operating characteristic of the motor, and, based on the comparison, detect a jam in the seeding system and generate a jam signal; and
   a motor control system configured to receive the jam signal and reverse an operating direction of the motor based on the jam signal.

2. The mobile planting machine of claim 1 and further comprising:
   a user interface component configured to display information related to the mobile planting machine, wherein the user interface component is configured to receive the jam signal and provide a jam indication based on the jam signal.

3. The mobile planting machine of claim 2 wherein the seeding system comprises a seed metering system in a row unit.

4. The mobile planting machine of claim 3, wherein the seed metering system comprises:
   a rotatable metering component, configured to meter seed, wherein the motor is a metering motor configured to drive the rotatable metering component, and wherein the jam detection component is configured to generate the jam signal indicative of a jam in the rotatable metering component.

5. The mobile planting machine of claim 1 wherein the seeding system comprises:
   a seed delivery system and wherein the motor drives the seed delivery system.

6. The mobile planting machine of claim 5 wherein the seed delivery system comprises:
   a brush belt comprising a plurality of bristles configured to receive metered seeds, and wherein the motor is a conveyance motor configured to drive the brush belt, wherein the jam detection component is configured to generate the jam signal indicative of a jam in the seed delivery system.

7. The mobile planting machine of claim 5 wherein the seed delivery system comprises a flighted belt delivery component.

8. The planting machine of claim 1, wherein the sensor comprises:
   a motor speed sensor that detects a motor speed of the motor.

9. The planting machine of claim 1, wherein the sensor comprises:
   a torque sensor that detects a torque generated by the motor.

10. A method of controlling a mobile planting machine, the method comprising:
    sensing a characteristic of a motor that drives a seeding system;
    generating a sensor signal indicative of the sensed characteristic of the motor;
    detecting whether a jam occurs in the seeding system based on a comparison of the sensor signal to a predefined range, wherein the predefined range indicates a normal operating characteristic of the motor;
    upon detecting the jam, controlling the motor to move in a reverse direction; and
    controlling the motor to move in a forward direction.

11. The method of claim 10, wherein sensing a characteristic of the motor comprises:
    sensing a motor speed of the motor.

12. The method of claim 10, wherein sensing a characteristic of the motor comprises:
    sensing a torque generated by the motor.

13. The method of claim 10 and further comprising:
    repeating the step of detecting whether a jam is present in the seeding system; and
    if so, controlling the motor to momentarily reverse the direction of the motor a predetermined number of times.

14. The method of claim 13 and further comprising:
    if the steps are repeated the predetermined number of times, then generating an operator jam notification.

15. A method for resolving a detected jam in a mobile planting machine, the method comprising:
    receiving a signal based on a sensed characteristic of a motor driving a seeding system in the planting machine;
    detecting a jam within the seeding system, based on a comparison of the signal to a predefined range indicating a normal operating characteristic of the motor;
    controlling the motor to operate in a reverse direction based on the detected jam;
    controlling the motor to operate in a forward direction;
    receiving the signal indicative of the characteristic of the motor; and determining, based on the received signal, whether the jam is still detected.

16. The method of claim 15, wherein the seeding system comprises a metering system with a metering motor, and wherein receiving the signal comprises:

receiving the signal from a sensor sensing the characteristic of the metering motor.

17. The method of claim 15, wherein the seeding system comprises a seed delivery system with a conveyance motor, and wherein receiving the signal comprises:

receiving the signal from a sensor sensing the characteristic of the conveyance motor.

18. The method of claim 15, wherein the signal comprises a motor speed signal indicative of motor speed, and wherein detecting a jam comprises:

comparing the motor speed to the predefined range, wherein the predefined range is a threshold motor speed;

determining whether the motor speed is less than the threshold motor speed; and if so, detecting a jam.

19. The method of claim 15, wherein the signal comprises a torque signal indicative of a torque generated by the motor and wherein detecting a jam comprises:

comparing the torque to the predefined range, wherein the predefined range is a threshold motor torque;

determining whether the torque is greater than the threshold motor torque; and if so, detecting a jam.

20. The method of claim 15, and further comprising:

in response to determining that the jam is still detected, repeating the steps of controlling the motor to operate in the reverse direction;

controlling the motor to operate in the forward direction;

receiving the signal; and determining, based on the signal, whether the jam is still detected.

* * * * *